3,388,120
ACYLATED CYANOALKYLATED STARCH MATERIALS
James A. Lotzgesell and Roland W. Best, Decatur, Ill., assignors to A. E. Staley Manufacturing Company, Decatur, Ill., a corporation of Delaware
No Drawing. Filed Nov. 25, 1966, Ser. No. 596,746
9 Claims. (Cl. 260—233.3)

ABSTRACT OF THE DISCLOSURE

Acylated cyanoalkylated starches having an acyl M.S. of between 0.005 and 0.3 and a cyanoalkyl M.S. of 0.0001 and 0.1 are useful in sizing and coating.

---

This invention relates broadly to certain viscosity stabilized mixed-ester-and-ether derivatives of amylaceous materials. More particularly, this invention relates to granular acyl-modified cyanoalkyl derivatives of starch materials having improved viscosity and rheological properties when pasted and to the use of such materials in paper-making operations.

Under most conditions the properties of cyanoalkylated starch materials are comparable to an in many instances superior to the properties of other derivatized starch materials. However, it has been found that in certain instances cyanoalkylated starches possess characteristics which can be undesirable. For example, it was found that, when a relatively high viscosity cyanoethyl starch is pasted in water, its viscosity exhibits an extremely high sensitivity to pH variations. This means that, with minor variations in pH of the liquid used in pasting the starch material or in the pasted starch itself, substantial changes in starch viscosity can result. It is not uncommon for the viscosity of a cyanoethylated-starch paste to increase or decrease by as much as 50% with a pH change of one pH unit, or even less, depending on the starch paste's initial viscosity. In addition to a change in the starch paste's viscosity, there may also occur other changes in the starch paste's rheological properties. For example, the starch paste may take on a stringy characteristic which makes an even flow of the starch paste virtually impossible.

These changes in the rheological or flow properties of a starch paste can cause serious problems during application particularly when a smooth even flow of starch paste is required. Just such a problem was encountered when paper sheets or webbing were sized in a size press operation which continuously leached out alum from the paper sheets as they passed between the size press rollers. Contact of the leached alum with the starch sizing agent resulted in a continuous pH change of the starch sizing agent which in turn caused a continuous change in the rheological properties of the sizing agent. This sequence of events caused the paper sheets to be unevenly and unsatisfactorily sized.

In addition to exhibiting a high viscosity-pH sensitivity it has been found that cyanoethyl starches will also show a substantial increase in viscosity after the granular cyanoethyl starch has been stored for a period of time. For example, cyanoethyl starches have been found to possess, after being stored for about one year, a viscosity which is at least five times as great after storage than it was before storage. Even for periods of time as short as one month or less, viscosity increases of from one to two-fold have been noted. Such viscosity changes can cause a serious inventory problem for both user and manufacturer since only small inventories of the cyanoethyl starch can be maintained.

Accordingly, it is a primary object of this invention to provide a viscosity stabilized cyanoalkylated starch material.

Another object of this invention is to provide a granular cyanoalkylated starch material which, when pasted, overcomes the viscosity-pH sensitivity exhibited by other types of cyanoalkylate starch materials.

Another object is to provide a granular cyanoalkylated starch material which is stabilized against viscosity changes due to aging.

A still further object of this invention is to provide a viscosity stabilized cyanoalkylated starch material suitable for use in many sizing and coating operations.

Other objects will be apparent from the description which follows.

Broadly, these and other objects of this invention are accomplished by acylating a partially degraded cyanoalkylated starch material to a degree whereby the acylated cyanoalkylated starch material is viscosity stabilized. Preferably the cyanoalkylated starch material is acylated to a degree whereby the material, in its pasted form, is stabilized against broad viscosity changes induced by fluctuations in pH of the pasted starch as well as by fluctuations in pH of the slurried starch during pasting and, in its granular form, is stabilized against viscosity changes arising from aging.

The stabilized cyanoalkylated starch materials of this invention may be broadly described as a mixed cyanoalkyl ether-carboxylate of starch which may be represented by the formula

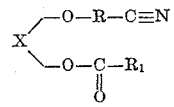

wherein X is any starch material, R is a divalent hydrocarbon radical having 1–8 carbon atoms, and $R_1$ represents a group of 1–23 carbon atoms as an alkyl, aryl, alkaryl and aralkyl group.

Preferably though X, is the above formula, is a granular, partially degraded, starch material, R is an alkylene radical having from 1–4 carbon atoms, and $R_1$ is an alkyl group having from 1–8 carbon atoms.

More specifically, the compositions of this invention are partially degraded acyl cyanoalkyl derivatives of starch materials having an acyl M.S. (molecular substitution) of between 0.005 and 0.3 and a cyanoalkyl M.S. of between about 0.0001 and 0.1 and preferably having an acyl M.S. of between 0.01 and 0.15 and a cyanoalkyl M.S. of between 0.001 and 0.05. If the mixed acyl-cyanoalkyl derivatives of starch are to be thermally pasteable or gelatinizable at a neutral pH (6–8), it is normally necessary for the acyl-cyanoalkyl M.S. total, that is the sum of the acyl and cyanoalkyl M.S., to be not greater than 0.40. Further, if retrogradation or congealing of the acylated cyanoalkylated starch material is to be avoided the total M.S. should be not less than 0.005. However, if the acyl-cyanoalkyl starch derivative is to be used as a paper sizing or paper coating agent, an acyl-cyanoalkyl M.S. total of between about 0.01 and 0.25 with an acyl-cyanoalkyl M.S. ratio of between 0.5:1 and 10:1 is normally preferred.

As used in this invention, M.S. (molecular substitution) represents the degree of molecular substitution per glucose unit on the starch molecule. For example, an acyl M.S. of 0.03 and a cyanoalkyl M.S. of 0.005 means that the starch molecule contains 3 acyl groups of 0.5 cyanoalkyl groups per 100 glucose units on the starch molecule.

The acylated cyanoalkylated products of this invention can be prepared by cyanoalkylating a starch material with a cyanoalkylating agent, such as acrylonitrile, to a cyanoalkyl M.S. of no greater than 0.1. The cyanoethylated starch is then acylated with an acylating agent, such as a vinyl acetate or acetic anhydride, to an acyl M.S. of no greater than 0.3. The acetylated cyanoethylated starch thereby produced may then be pasted in the usual way for use as a paper coating or paper sizing agent.

The amylaceous material which may be used in preparing the products of this invention may be any native starch or material containing native starch. Corn starch, tapioca starch, wheat starch, rye starch, potato starch, sago starch, waxy corn starch and the amylose and amylopectin fractions therefrom are representative of the various native starches and starch fractions which may be used in this invention. Certain derivatives of the above starch may also be used. These materials are referred to in the claims as starch or starch materials.

As previously stated, if the products of this invention are to be used as paper-sizing or paper-coating agents, the acylated-cyanoalkylated starch materials are preferably materials which have been partially degraded or partially hydrolyzed. Partial degradation of the starch product reduces the viscosity of the starch on pasting and thereby permits a higher concentration of solids to be used with the starch paste when it is used as a coating agent. Further, the partially degraded starch increases the starch's capabilities for penetrating cellulosic fibers and thereby improves the binding of the cellulosic surface fibers whether the pasted starch product is used as a sizing or a coating agent.

There are basically five methods used commercially for degrading granular starch; namely, enzyme conversion, oxidation with alkaline hypochlorite or other oxidizing agent, acid hydrolysis, homogenizing and high temperature-high pressure cooking. If a granular product is desired enzyme conversion, homogenizing and high temperature cooking are normally not used for degrading the starch material as certain amounts of pasting will generally accompany the degradation process. The starch oxidation method is likewise not normally used if the starch is to be used as a surface coating or sizing agent since oxidized starches have a dispersing effect on pigments when broke is being recirculated to the stock system supplying the paper making machine. Accordingly, the preferred method for degrading starch is by acid hydrolysis especially when a granular starch product is desired.

Normally the starch material is hydrolyzed before it is cyanoalkylated. However, if desired, the acid hydrolysis step can be carried out after the cyanoalkylation reaction if sufficient care is used to avoid substantial hydrolysis of the nitrile group.

Partial degradation of starch by acid hydrolysis can be accomplished by adding a strong acid to a starch suspension containing about 10% to 60% starch by weight. The strong acid is typically an acid having a high ionization constant, such as sulfuric or hydrochloric acid, and is generally added to the starch suspension as an aqueous solution in an amount of between 0.1 to 10% by weight of the starch on a dry weight basis. However, the granular starch can be added to the acid solution if desired. The suspension is then heated to a temperature under the gelatinization temperature of the starch. Heating is continued until the acid-hydrolyzed starch has reached the desired fluidity. The slurry is then neutralized with a strong base, such as sodium hydroxide, potassium hydroxide, tetramethyl ammonium hydroxide, sodium carbonate, calcium hydroxide, etc. The granular starch can be isolated by filtration and washed or sufficient base can be added during the neutralization step to catalyze the subsequent cyanoethylation reaction. In this latter manner the isolation and even the washing of the acid-hydrolyzed starch can be avoided. Generally, the granular starch is hydrolyzed to a 12-gram alkali fluidity of between about 15–90 cc. The degree to which the starch is hydrolyzed depends to a large extent on the intended use of the final product.

For example, if the product of this invention is to be used as a paper sizing agent and in order to impart to the paper a maximum tensile strength and Mullen burst value, the granular starch is preferably acid-hydrolyzed to a 12-gram alkali fluidity of between 20–60 cc. Normally a starch having a relatively high fluidity is employed if the starch material is to be used in surface sizing and particularly at the size press. However, when sizing at the calender stack a less highly degraded (lower fluidity) acylated cyanoalkylated starch can be used with advantage, particularly if less penetration is desired.

The alkaline fluidity of the acid-hydrolyzed starch referred to above and hereafter referred to was determined by the following procedure. Twelve grams of the acid-hydrolyzed starch (dry solids basis) was placed in a standard (250 ml.) fluidity beaker. Eighty ml. of 0.75 N NaOH and 20 ml. of water was added to the beaker and the mixture stirred at between 450 and 460 r.p.m. for three minutes. The starch paste thereby obtained contained 12 grams of starch and 2.40 grams of NaOH per 110 cc. of starch paste. The starch paste was then poured into a standard fluidity funnel having a specific "water-time" of between about 30 and 40 seconds. (The "water-time" is the number of seconds it takes for 100 cc. of water to flow through the funnel). The number of cc. of starch paste which flows through the funnel in the "water-time" is the fluidity of the starch. Unmodified starch has a fluidity of about 1 cc.

The partially degraded starch material can be cyanoalkylaed by any known method for introducing a cyanoalkyl group on a starch material as an ether type linkage. Normally the cyanoalkylation reaction is conducted in an aqueous alkaline suspension having a pH of between 7 and 12 using a concentration of cyanoalkylating agent sufficient to provide a M.S. of between 0.0001 and 0.1. In this M.S. range the utilization of acrylonitrile as the cyanoalkylating agent is quite efficient, since as much as 90% or more of the acrylonitrile added will react with the starch. Due to this efficiency and in order to place as small a burden on plant sanitation facilities as possible, it is preferred to utilize from about 0.005 to .12 moles of acrylonitrile per mole of starch. However, larger (e.g. 0.20 mole) and smaller (e.g. 0.001 mole) concentrations of acrylonitrile can be used. The cyanoalkylation reaction is conducted at a temperature below the gelatinization temperature of the starch under standard operating conditions until the cyanoalkylation reaction is complete. The slurry is then neutralized with dilute acid (sulfuric acid, hydrochloric acid, acetic acid, etc.) to a pH of about 7–10. At this point the slurry is ready to be acylated. However, if desired, the slurry can be washed with water, dried, and acylated at a later time. A more detailed description on the cyanoalkylation of starch using acrylonitrile can be found in U.S. patent application Serial No. 362,991, filed April 27, 1964.

The cyanoalkylated starch material thereby obtained is then reacted with an acylating agent capable of introducing an acyl group on the cyanoalkylated starch as an ester type linkage. Acylating or esterifying agents capable of introducing an acyl group on the amylaceous material include; lower aliphatic acids in the presence of an acid catalyst; lower aliphatic acid chlorides and lower aliphatic acid anhydrides, such as acetic anhydride, in the presence of a pyridine, quinoline, sodium hydroxide, sodium carbonate, and the like; and vinyl esters of monocarboxylic acids in the presence of a buffer type catalyst, such as sodium phosphate. Various aromatic acids as well as their respective acid halides and anhydrides may also be used. The esterifying agents may be of the saturated or unsaturated variety, i.e. contain vinyl groupings. A more complete discussion on the acylation of starch materials can be found in Kerr's Chemistry and Industry of Starch, second edition, pages 262–293. Of special interest are pages 269 and 270 of the above reference in which acylation by use of various acid anhydrides (acetic anhydride, succinic anhydride, etc.) is described.

A particularly useful method for acylating amylaceous and cellulose materials is described in U.S. Patent 3,022,289. This patent discloses the use of ethylenically unsaturated esters (vinyl esters) of various organic acids in the presence of an alkaline catalyst. This particular method has special utility in producing the compounds of this invention as the cyanoalkylation process is also performed under alkaline conditions.

If the vinyl ester technique is employed for acylating amylaceous materials and if cross-linking of the acylated material is not desired, it is essential that the reaction be conducted under alkaline conditions. Cross-linking occurs by virtue of the generation of an acetaldehyde by-product arising from the reaction of an amylaceous material with a vinyl ester of an organic acid at a pH of below 4. The above described acylation and cross-linking action is described in U.S. Patent 3,081,296.

For convenience the useful vinyl esters can be represented by the formula

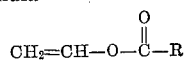

$$CH_2=CH-O-\overset{O}{\underset{\|}{C}}-R$$

wherein R represents 1–23 carbon atoms as an alkyl, aryl alkaryl, aralkyl group or mixtures thereof.

The preferred vinyl esters are the vinyl esters of lower aliphatic monocarboxylic acids containing 1–5 carbon atoms, such as vinyl acetate, vinyl propionate, vinyl formate, etc. Although the vinyl esters of higher fatty acids and aromatic acids are not as reactive as the acylating agents of lower aliphatic acids, useful results can be obtained by the use of such compounds. For example, vinyl stearate, vinyl phenyl acetate, vinyl benzoate, vinyl toluate, vinyl naphthenate, vinyl chloroacetate, etc. can be used.

Prior to acylation, the cyanoalkylated starch material may be water washed once or several times to avoid possible discoloration of the final product. These water washes are conducted under conditions which avoid hydrolysis of the cyanoalkylated starch. Normally the water wash is conducted at a pH between 6–8 and at a temperature below 80° F.

The acylation reaction is normally conducted by suspending from 2–70% and preferably between about 10–40%, of the cyanoalkylated starch material in a liquid medium such as water. An acylating agent, such as a vinyl ester of a lower aliphatic carboxylic acid and preferably such vinyl esters as vinyl formate, vinyl acetate or vinyl propionate, is added in amounts ranging between 0.5 part to 10 parts acylating agent per 100 parts cyanoalkylated starch material depending on the degree of substitution desired. If an acyl M.S. of 0.02 is desired about 2 parts by weight acylating agent per 100 parts cyanoalkylated starch is normally used.

Preferably the acylation reaction is conducted in the presence of a catalyst. A preferred catalyst for the acylation is an alkali metal hydroxide, such as sodium hydroxide and potassium hydroxide. Other useful catalysts include the alkali metal salts, such as sodium carbonate; the quaternary ammonium hydroxides such as tetramethyl ammonium hydroxide; and the amines such as trimethyl amine, pyridine, etc. Mixtures of the alkali metal hydroxides and the alkali metal salts such as sodium hydroxide and sodium chloride may also be used.

The rate of the acylation reaction is moderately rapid at temperature above 75° F. For example, the acylation reaction is essentially complete in about 10 minutes at a temperature of 100° F. Higher temperature increases the reaction rate and may be used if desired, however, care must be taken to maintain a temperature below the decomposition temperature of the starch derivative or the temperature at which the granular structure of the starch would be lost. Useful, but slower reaction rates are also possible at temperatures between 35°–40° F. Reaction efficiencies at the higher temperatures are improved by conducting the reaction in a closed vessel to prevent loss of volatile vinyl esters.

When the desired degree of acyl substitution (M.S. of between 0.005 and 0.3) is obtained the reaction can be terminated by lowering the pH of the reaction to about 7 but generally not below a pH of 4 unless cross-linking of the acylated cyanoalkylated starch material is desired. The double-derivatized granular starch material is then washed with water, alcohol or acetone either alone or in combination. The starch is then dried at temperatures of between 70° F. and 130° F. Normally no other modification of the acylated cyanoalkylated starch material is necessary in order for the starch material to be used as a sizing or coating agent in various sizing and coating operations. However, if the starch material shows signs of discoloration, the starch material may be bleached, if desired, by means well known in the art. For example, bleaching agents such as potassium permanganate, sodium hypochlorite and the like may be used. Care must be taken in using the bleaching agents as excessive bleaching tends to reduce the viscosity of the double derivatized starch.

The granular acylated cyanoalkylated starches of this invention have many uses in various sizing and coating operations in the paper making industry. For example, a granular acetylated cyanoethylated starch material having an acetyl M.S. of between 0.01 and 0.05, a cyanoethyl M.S. of between 0.01 and 0.05, and a viscosity of between 15 centipoises and 150 centipoises as measured on a Model RVT Brookfield Viscometer at 20 r.p.m. using a #1 spindle at 150° F. and 10.5% d.s. solids performed exceptionally well as a paper sizing agent at the size press.

The above granular acetylated cyanoethylated starch material can be made ready for use at the size press by slurrying between about 1 to 20% by weight of the starch material in water. The starch material is then thermally pasted by either batch means or in a continuous starch cooker (e.g. a jet cooker) at a neutral pH (6 to 8) and introduced into a size box of a size press. The size press consists of two rolls in pressing tangential contact between which paper travels at a rate of between about 50 to 2,000 feet per minute. The starch sizing material can be applied to the paper by passing the paper through a "puddle" of size, by spraying the size on the paper or by any other convenient means.

During the sizing operation the pH of the size solution may be lowered by as much as 4 pH units because of the leaching out of alum from the paper passing between the rolls of the size press. In certain other cyanoethylated starches, a change in the sizing agent's pH will cause a change in the starch paste's viscosity and thus alter the starches rheology or flow characteristics, but not in the products of this invention.

It was further found the acetylated cyanoethylated starch material above prepared, resisted dispersement of pigments and cellulosic fines generally present in the papermaking furnish when broke containing the acetylated cyanoethylated starch is returned to the wet end of the papermaking process. Inasmuch as about 5% to 25% of the paper produced in a paper mill ends up as broke and is repulped and reformed into paper, any loss of pigment in the laying of the paper web due to the dispersing effect found in certain other starches and particularly in oxidized starches, can be costly. Thus the non-dispersing effect of acetylated cyanoethylated starches is an extremely important and valuable property in a paper sizing agent.

In addition, paper sized with the composition of this invention exhibited increased tensile strength and burst strengh (Mullen value) and could be erased without destroying its fiber structure. The sized paper also exhibited a smooth, hard surface which reduced "feathering" when written upon and did not "pick" when the paper was printed with tacky inks.

Because the starches of this invention possess a pH-viscosity stability and because the starches do not disperse pigments, the starches can also be used in other paper making operations, such as pigment-coating applications or at the calender stack operation. If the starches of this invention are to be used in other paper making operations, the viscosity of the starch paste may have to be further adjusted. However, this viscosity modification can be readily accomplished by varying any of the following variables all of which have some interrelating effect on the starch's viscosity.

For example, the degree of acid degradation of the starch starting material can be altered, the acyl or cyanoalkyl M.S. can be varied, the type and degree of bleaching of the derivatized starch material, and/or combinations of the above can be used.

The preferred method for preparing the starches of this invention is to first cyanoalkylate the acid-hydrolyzed starch material with a cyanoalkylating agent to the desired cyanoalkyl M.S. and then to acylate the cyanoalkylated starch material. Although the order of reaction can be reversed, extreme care must be taken to avoid possible hydrolysis of the ester group during the alkali catalyzed cyanoalkylation reaction.

The examples to follow illustrate methods for producing the composition of this invention, the advantages gained therefrom and the compound's utility, particularly in the area of paper sizing and paper coating. These examples, however, are not intended to place any limitation on the scope of this invention.

Example 1

A granular acetylated cyanoethyl starch having an acetyl M.S. of 0.035 and a cyanoethyl M.S. of 0.025 was prepared in the following manner.

Corn starch was first partially degraded (hydrolyzed) by adding to a reaction vessel 3.5 parts by weight sulfuric acid as a 30 Bé aqueous solution to 100 parts by weight unmodified corn starch slurry suspended in 225 parts by weight water. The starch slurry was then heated to a temperature of 126° F. and maintained at that temperature until the starch had a 12.0 gram alkali fluidity of 33 cc. The acid hydrolysis reaction was then terminated after about 4-5 hours by raising the pH of the reaction medium to 11. The pH adjustment was performed by adding 4.4 parts by weight sodium carbonate (dry solids basis) as a 15% by weight aqueous solution, and 0.5 parts by weight NaOH (dry solids basis) as a 3.0% aqueous solution. The reaction vessel was sealed and then purged by bubbling nitrogen through the slurry. Upon completion of the nitrogen purge, the starch was cyanoethylated by adding 1.0 parts by weight acrylonitrile to the slurry through a dip tube under the surface of the slurry. After about 5 hours at 115° F. the reaction medium was adjusted to a pH of between 9.3 and 9.5 with a 10% solution of hydrochloric acid. The cyanoethylated starch was then acetylated by mixing 1.5 parts of vinyl acetate to the reaction medium. The acetylation reaction was allowed to proceed for about 30 minutes at a temperature of 115° F. and then the pH of the reaction mixture was adjusted to a pH of between 5.5 and 6.0 by the addition of a 10% solution of hydrochloric acid. The granular acetylated cyanoethyl starch was then separated from the water-starch slurry by filtration and washed with water at a temperature not exceeding 130° F. The slurry was then dried at a temperature of 100° F. to provide a starch product having a moisture content of about 12%.

Examples 2–7

Following the procedure of Example 1 granular corn starch was reacted with different amounts of acrylonitrile and vinyl acetate to produce a series of starch derivatives. The derivatized starch materials thereby obtained were then pasted at a neutral pH by combining 10.5 parts of starch on a dry substance basis with 89.5 parts of water and heating on a steam bath to a temperature of 205° F. and held at this temperature for 10 minutes. The viscosity and held at this temperature for 10 minutes. The viscosity, in centipoises, for each of the starch pastes was determined on a Brookfield Viscometer at 20 r.p.m. and a temperature of 150° F. To each of the starch pastes, dilute hydrochloric acid was added and the viscosities of the starch pastes again determined at several lower pH values. The results obtained for each of the starch materials are reported in Table I. These results show that, over a broad range of pH values, the acetylated cyanoethylated starch materials will undergo little, if any, change in viscosity due to pH changes of the starch paste.

TABLE I

| Example | M.S. Values | | pH Values | | | |
|---|---|---|---|---|---|---|
| | Cyano- | Acetyl | 5.5 | 6.5 | 7.5 | 8.0 |
| 2 | 0.05 | | 1,150 | 610 | 400 | 25 |
| 3 | 0.025 | 0.02 | 45 | 50 | 50 | 50 |
| 4 | 0.025 | 0.03 | 38 | 35 | 40 | 42 |
| 5 | 0.025 | 0.04 | 45 | 55 | 50 | 45 |
| 6 | 0.012 | 0.04 | 43 | 45 | 45 | 47 |
| 7 | 0.038 | 0.02 | 50 | 42 | 37 | 32 |

Examples 8–10

Following the procedure of Example 1 granular corn starch was reacted with various amounts of acrylonitrile and vinyl acetate. The products thereby obtained were pasted at a neutral pH by combining 10.5 parts of starch on a dry substance basis with 89.5 parts of water and heating on a steam bath to a temperature of 205° F. and held at this temperature for 10 minutes. The viscosity of the pasted starch product was then determined at a neutral pH and at a temperature of 150° F. on a Brookfield Viscometer at 20 r.p.m. The starch paste was allowed to cool overnight (approximately 16 hours) and the viscosity of the cooled starch paste determined by the above method. The results reported in Table II show that there was no gelling of the acetylated cyanoethylated starch material and further that there was a substantially smaller change in the starch paste's viscosity upon standing overnight. The above results are compared with both cyanoethyl and acetyl starches.

TABLE II

| Ex. | M.S. Values | | Percent d.s. Solids | Viscosity at Neutral pH | | Change Factor |
|---|---|---|---|---|---|---|
| | Cyanoethyl | Acetyl | | 150° F. | 77° F. Overnight | |
| 8 | 0.05 | | 10.5 | 70 | 940 | 13.4 |
| 9 | 0.025 | 0.03 | 10.5 | 45 | 275 | 6.1 |
| 10 | | 0.04 | 10.5 | 26 | [1] 3,320 | 128.0 |

[1] Semirigid gel.

When Examples 8–10 are repeated with other acylated cyanoalkylated starch materials comparable results are obtained.

Example 11

In this example a cyanoethylated starch material having a cyanoethyl M.S. of 0.5 and an acetylated cyanoethylated starch material having a cyanoethyl M.S. of 0.025 and an acetyl M.S. of 0.02 were prepared in accordance with the procedure described in Example 1. The cyanoethylated starch material had a paste viscosity of 70 cps. while the acetylated cyanoethylated starch material had a paste viscosity of 40 cps. After both of the starch materials were stored in a closed container for one year, the cyanoethylated starch material when pasted had a viscosity of 400 cps. and the acetylated cyanoethylated material had a viscosity of 52 cps. This example shows that the granular acetylated cyanoethylated starch material can be stored for extended periods of time without causing the viscosity of the starch to be substantially increased.

Example 12

Three thousand pounds of the acetylated cyanoethylated acid-hydrolyzed corn starch produced in the manner described in Example I was slurried in water at 12% solids in a 3,500 gallon tank and pasted by heating the slurry to 208° F. The starch paste was supplied to a service tank (maintained at 145° F.) supplying a size bath of a vertical size press of a Fourdrinier paper-making machine running at 900 feet per minute. The size was sprayed onto the bottom roll of the size press and supplied as a puddle to the top of the paper web. The paper web passing through the nip of rolls was subjected to pressure of about 100 pounds per lineal inch and then dried. A batch of alkaline-hypochlorite-oxidized starch was also used as a size with the paper machine under comparable operating conditions and the results of the two sizing operations compared. The erasure properties, Mullen value, opacity, smoothness, porosity, oil flotation, ink flotation and stiffness of the base paper sized with acetylated cyanoethylated starch of this invention were comparable to those obtained with the oxidized starch. There was, however, no dispersing of pigments or fiber noted upon recycling the acetylated cyano-alkylated starch sized broke to the wet end of the machine.

The above illustrates that the acetylated cyanoethylated starches of this invention are excellent size press starches.

Example 13

This example shows that the acetylated cyanoethylated starch material of this invention is comparable to other sizing agents. This can be demonstrated by slurrying 3,000 pounds of the acetylated cyanoethylated acid-hydrolyzed corn starch produced in the manner described in Example 1 in 1,800 gallons of water and thereafter pasting at 196° F. to form a 10% by weight solids paste. The starch paste is then pumped to a storage tank of an off-machine tub sizing operation. A 30-pound, bleached sulfite sheet containing 50 pounds per ton of titanium dioxide and clay filler (ratio of titanium dioxide to clay filler was 75/100) is passed through the tube size, through the nip of a vertical size press and dried. When essentially the same operation is repeated with a hydroxyethyl size press starch and/or an oxidized size press starch, it is found that paper sized with the acetylated cyanoethylated acid-hydrolyzed starch of this invention and hydroxyethyl starch have essentially the same effect on the erasure properties, Mullen value, porosity, opacity, smoothness and stiffness of the base paper. However, the acetylated cyanoethylated starch material is found to be superior to oxidized starch materials as there is no dispersing of the titanium dioxide particles. TAPPI Routine Control Method RC–14 entitled "Ink Penetration of Paper (Flotation)" and modified TAPPI Routine Control Method RC–74 entitled "Surface Sizing Feathering Test" further show that paper sized with the acetylated cyanoethylated starch of this invention is better than or equivalent to paper sized with hydroxyethyl starches and/or oxidized starches.

Since many embodiments of this invention can be made and since many changes may be made in the embodiments described, the foregoing is to be interpreted as illustrative only and our invention is defined by the claims appended hereafter.

We claim:

1. An acylated cyanoalkylated starch material having an acyl M.S. of between about 0.005 and 0.3 and a cyanoalkyl M.S. of between 0.0001 and 0.1 characterized by its ability to be gelatinized at a neutral pH and to exhibit, in its gelatinized form, improved viscosity and rheological properties.

2. The starch material of claim 1 wherein the total acyl-cyanoalkyl M.S. is not greater than 0.40.

3. The starch material claim 2 wherein the starch material is a mixed cyanoalkyl ether-carboxylate of starch having the formula

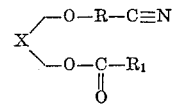

wherein X is any starch material, R is a divalent hydrocarbon radical having 1–8 carbon atoms and $R_1$ represents a group of 1–23 carbon atoms as an alkyl, aryl, alkaryl and aralkyl group.

4. The starch material of claim 3 wherein X, in the represented formula, is a partially degraded starch material, R is an alkylene radical having from 1–4 carbon atoms and $R_1$ is an alkyl group having 1–8 carbon atoms.

5. The starch material of claim 1 wherein the acylated cyanoalkylated starch material is a granular, partially degraded acetylated cyanoethylated starch material which exhibits a viscosity-pH stability when pasted.

6. An acylated cyanoalkylated starch material having a total acyl cyanoalkyl M.S. of between 0.01 and 0.25 with an acyl-cyanoalkyl M.S. ratio of between 0.5:1 and 10:1.

7. The composition of claim 6 wherein the starch material is an acetylated cyanoethylated starch material.

8. A process for sizing or coating cellulosic material comprising contacting said cellulosic material with the pasted acylated cyanoalkylated starch material of claim 1.

9. The process of claim 8 wherein the acylated cyanoalkylated starch material is a partially degraded acetylated cyanoethylated starch material which in pasted form exhibits a viscosity-pH stability.

References Cited

UNITED STATES PATENTS 3,224,891   12/1965   Yeates et al. _____ 106—213

FOREIGN PATENTS 214,534   8/1956   Australia.

DONALD E. CZAJA, *Primary Examiner.*

R. W. MULCAHY, *Assistant Examiner.*